(12) United States Patent
Radivojevic et al.

(10) Patent No.: US 10,459,090 B2
(45) Date of Patent: Oct. 29, 2019

(54) APPARATUS FOR DETECTING RADIATION AND METHOD OF PROVIDING AN APPARATUS FOR DETECTING RADIATION

(71) Applicant: Nokia Technologies Oy, Espoo (FI)

(72) Inventors: Zoran Radivojevic, Cambridge (GB); Michael Astley, Cambridge (GB); Piers Andrew, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/757,487

(22) PCT Filed: Aug. 31, 2016

(86) PCT No.: PCT/FI2016/050602
§ 371 (c)(1),
(2) Date: Mar. 5, 2018

(87) PCT Pub. No.: WO2017/042429
PCT Pub. Date: Mar. 16, 2017

(65) Prior Publication Data
US 2019/0025441 A1 Jan. 24, 2019

(30) Foreign Application Priority Data
Sep. 9, 2015 (EP) .................................... 15184538

(51) Int. Cl.
*G01T 1/36* (2006.01)
*G01T 1/20* (2006.01)
(52) U.S. Cl.
CPC .......... *G01T 1/2002* (2013.01); *G01T 1/2018* (2013.01)

(58) Field of Classification Search
CPC ....... G01T 1/20; G01T 1/2002; G01T 1/2006; G01T 1/2008; G01T 1/201; G01T 1/2018; G01T 1/202
See application file for complete search history.

(56) References Cited

U.S. PATENT DOCUMENTS 8,373,132 B2 2/2013 Baeumer et al.
9,594,036 B2 * 3/2017 Yun ...................... G01N 23/223
(Continued)

FOREIGN PATENT DOCUMENTS

CN 104 035 121 9/2014
KR 2011-0115432 A 10/2011

OTHER PUBLICATIONS

"X-Ray Scintillators", Siemens, Retrieved on Mar. 8, 2018, Webpage available at : http://www.healthcare.siemens.co.uk/siemens_hwem-hwem_ssxa_websites-context-root/wcm/idc/groups/public/@global/@imaging/@ct/documents/download/mdaw/mty4/~edisp/flyer_x_ray_scintillators_150dpi-00080313.pdf.
(Continued)

*Primary Examiner* — David P Porta
*Assistant Examiner* — Mamadou Faye
(74) *Attorney, Agent, or Firm* — Alston & Bird LLP

(57) ABSTRACT

An apparatus and method, the apparatus comprising: a plurality of layers of scintillator material configured to generate photons in response to incident radiation; and a plurality of layers of spacer material wherein the scintillator material and spacer material are arranged in alternate layers so that a plurality of interfaces are provided between layers of scintillator material and layers of spacer material; wherein the scintillator material has a different refractive index to the spacer material and the thickness of layers within the
(Continued)

plurality of layers is arranged to enable constructive interference of photons emitted by the scintillator material and reflected by the interfaces.

23 Claims, 5 Drawing Sheets

(56) References Cited

U.S. PATENT DOCUMENTS

| | | | | |
|---|---|---|---|---|
| 2004/0140431 | A1* | 7/2004 | Schmand | G01T 1/2018 250/367 |
| 2005/0109962 | A1 | 5/2005 | Trauernicht et al. | |
| 2010/0103678 | A1* | 4/2010 | Van De Ven | F21K 9/00 362/294 |
| 2010/0296625 | A1* | 11/2010 | Wainer | G01T 1/2018 378/19 |
| 2012/0032085 | A1* | 2/2012 | Baeumer | G01T 1/1647 250/362 |
| 2013/0308755 | A1* | 11/2013 | Ishida | G01T 1/202 378/62 |

OTHER PUBLICATIONS

Nakagawa et al., "Design Consideration on Position Sensitive Detectors Based on LuAG:Pr Scintillators for High Energy X-ray Cargo Inspection", Progress in Nuclear Science and Technology, vol. 1, 2011, pp. 285-287.

"Aqua Advanced Quality Assurance: Proton Range Radiography PRR", Project Aqua, Retrieved on Mar. 26, 2018, Webpage available at : https://project-aqua.web.cern.ch/project-aqua/prr.html.

Celebi et al., "Simplified Calculation of Dipole Energy Transportin a Multilayer Stack Using Dyadic Green's Functions", Optics Express, vol. 15, No. 4, Feb. 19, 2007, 11 pages.

Extended European Search Report received for corresponding European Patent Application No. 15184538.5, dated Mar. 7, 2016, 8 pages.

International Search Report and Written Opinion received for corresponding Patent Cooperation Treaty Application No. PCT/FI2016/050602, dated Nov. 25, 2016, 16 pages.

\* cited by examiner

Average angular emission profile, layer thickness 77.1% of wavelength

APPARATUS FOR DETECTING RADIATION AND METHOD OF PROVIDING AN APPARATUS FOR DETECTING RADIATION

RELATED APPLICATION

This application was originally filed as PCT Application No. PCT/FI2016/050602 filed Aug. 31, 2016, which claims priority benefit from EP Patent Application No. 15184538.5, filed Sep. 9, 2015.

TECHNOLOGICAL FIELD

Examples of the disclosure relate to an apparatus for detecting radiation and method of providing an apparatus for detecting radiation. In particular, they relate to an apparatus for detecting radiation and method of providing an apparatus for detecting radiation and providing a high resolution image corresponding to the detected radiation.

BACKGROUND

Scintillators which are used to convert incident high energy radiation such as X-rays into photons are known. The photons generated by the scintillator may then be detected by a photodetector so that the photodetector provides an electrical signal indicative of the incident X-rays or other high energy radiation. The electrical signal may then be processed to provide an image corresponding to the detected X-rays or other high energy radiation.

The thickness of the scintillator material which is used affects the performance of a radiation detector such as an X-ray detector. If the scintillator material is too thick then interactions of the photons within the scintillator material will cause the beam of photons emitted by the scintillator material to spread out rather than be provided in a focused beam. This will decrease the resolution of images obtained by the X-ray detector. If the scintillator material is thin then this may allow for a high resolution of images to be obtained as it will decrease the amount of spreading of the beam of photons. However, having a thin layer of scintillator material will decrease the amount of X-rays absorbed by the scintillator material. This will decrease the sensitivity and the efficiency of the X-ray detector.

It is useful to provide an improved scintillator apparatus and method of providing such apparatus.

BRIEF SUMMARY

According to various, but not necessarily all, examples of the disclosure there may be provided an apparatus comprising: a plurality of layers of scintillator material configured to generate photons in response to incident radiation; and a plurality of layers of spacer material wherein the scintillator material and spacer material are arranged in alternate layers so that a plurality of interfaces are provided between layers of scintillator material and layers of spacer material; wherein the scintillator material has a different refractive index to the spacer material and the thickness of layers within the plurality of layers is arranged to enable constructive interference of photons emitted by the scintillator material and reflected by the interfaces.

In some examples the constructive interference may be configured to collimate photons emitted by the scintillator material towards a direction perpendicular to the plurality of layers of scintillator material and plurality of layers of spacer material.

In some examples the plurality of layers of scintillator material and plurality of layers of spacer material may be arranged to form a distributed Bragg reflector.

In some examples the plurality of layers of scintillator material and plurality of layers of spacer material maybe configured so that photons emitted by the scintillator material are focussed in a small area.

In some examples the plurality of layers of scintillator material and plurality of layers of spacer material may be configured so that photons emitted by the scintillator material are arranged to be focused on a pixel of a photodetector.

In some examples the scintillator material may have a higher refractive index than the spacer material.

In some examples the spacer material may comprise a second type of scintillator different to a first type of scintillator within the scintillator material.

In some examples the thickness t of the layers within the plurality of layers of scintillator material and plurality of layers of spacer material may be given by $t = x\lambda/n$, where x is a fraction of wavelength of the photon, $\lambda$ is the free-space wavelength of the photon and n is the refractive index of the layer.

In some examples the apparatus may comprise a reflective layer.

In some examples the apparatus may comprise a photodetector.

In some examples the scintillator material may be configured to generate photons in response to incident X-rays.

According to various, but not necessarily all, examples of the disclosure there may be provided a radiation detector comprising an apparatus as described above.

According to various, but not necessarily all, examples of the disclosure there may be provided a method comprising: providing a plurality of layers of scintillator material configured to generate photons in response to incident radiation; and providing a plurality of layers of spacer material wherein the scintillator material and spacer material are arranged in alternate layers so that a plurality of interfaces are provided between layers of scintillator material and layers of spacer material; wherein the scintillator material has a different refractive index to the spacer material and the thickness of layers within the plurality of layers is arranged to enable constructive interference of photons emitted by the scintillator material and reflected by the interfaces.

In some examples the constructive interference may be configured to collimate photons emitted by the scintillator material towards a direction perpendicular to the plurality of layers of scintillator material and plurality of layers of spacer material.

In some examples the plurality of layers of scintillator material and plurality of layers of spacer material may be arranged to form a distributed Bragg reflector.

In some examples the plurality of layers of scintillator material and plurality of layers of spacer material may be configured so that photons emitted by the scintillator material are focussed in a small area.

In some examples the plurality of layers of scintillator material and plurality of layers of spacer material may be configured so that photons emitted by the scintillator material are arranged to be focused on a pixel of a photodetector.

In some examples the scintillator material may have a higher refractive index than the spacer material.

In some examples the spacer material may comprise a second type of scintillator different to a first type of scintillator within the scintillator material.

In some examples the thickness t of the individual layers within the plurality of layers of scintillator material and plurality of layers of spacer material may be given by $t=x\lambda/n$, where x is a fraction of wavelength of the photon, $\lambda$ is the free-space wavelength of the photon and n is the refractive index of the layer.

In some examples the method may comprise providing a reflective layer.

In some examples the method may comprise providing a photodetector.

In some examples the scintillator material may be configured to generate photons in response to incident X-rays.

According to various, but not necessarily all, examples of the disclosure there is provided examples as claimed in the appended claims.

BRIEF DESCRIPTION

For a better understanding of various examples that are useful for understanding the detailed description, reference will now be made by way of example only to the accompanying drawings in which:

FIG. 1 illustrates an apparatus;
FIG. 2 Illustrates an apparatus;
FIG. 3 Illustrates an apparatus in an X-ray detector;
FIG. 4 illustrates a method; and
FIGS. 5A to 5D are plots showing results which may be obtained with example apparatus.

DETAILED DESCRIPTION

The Figures illustrate an apparatus 1 comprising: a plurality of layers 9 of scintillator material 3 configured to generate photons in response to incident radiation; and a plurality of layers 9 of spacer material 5 wherein the scintillator material 3 and spacer material 5 are arranged in alternate layers 9 so that a plurality of interfaces 7 are provided between layers 9 of scintillator material 3 and layers of spacer material 5; wherein the scintillator material 3 has a different refractive index to the spacer material 5 and the thickness of layers 9 within the plurality of layers 9 is arranged to enable constructive interference of photons emitted by the scintillator material 3 and reflected by the interfaces 7.

The apparatus 1 may be for detecting radiation. In some examples the apparatus 1 may be for detecting X-rays or other high energy electromagnetic radiation. The apparatus 1 may be for enabling high resolution images to be provided.

FIG. 1 schematically illustrates an example apparatus 1 according to examples of the disclosure.

The example apparatus 1 comprises a plurality of layers 9. The plurality of layers 9 are arranged in a lamina structure. The plurality of layers 9 are arranged overlaying each other within the lamina structure. In the example apparatus 1 of FIG. 1 each of the layers 9 is flat or substantially flat. A flat or substantially flat interface 7 is provided between any two adjacent layers 9.

The apparatus 1 comprises a plurality of layers 9 of scintillator material 3. The scintillator material 3 may comprise any suitable material which may be configured to generate photons in response to incident radiation. The incident radiation may comprise high energy electromagnetic radiation. The incident radiation may comprise X-rays.

The material that is used as the scintillator material 3 may be dependent on the radiation that is to be detected. In some examples the scintillator material 3 could comprise caesium iodide, a polymer or any other suitable materials. In some examples the material that is used as the scintillator material 3 may be arranged to be sensitive to particular wavelengths of the incident radiation.

In some examples the scintillator material 3 may comprise phosphors. Examples of phosphors which could be used comprise, ZnS:Ag, $CaWO_4$, $Gd_2O_2S$:Tb, $Gd_2O_2S$:Pr, Ce, F, LaOBr:Tb, $YTaO_4$:Nb, $Lu_2O_3$:Eu, $SrHfO_3$:Ce or any other suitable phosphor.

In some examples the scintillator material 3 may comprise single crystal scintillators. Examples of single crystal scintillators which could be used comprise, CsI:Tl, NaI:Tl, $LaBr_3$:Ce, $K_2LaI_5$:Ce, $BaF_2$, $Bi_4Ge_3O_{12}$, $PbWO_4$, $CdWO_4$, $YAlO_3$:Ce, $LuAlO_3$:Ce, $Y_3Al_5O_{12}$:Ce, $Lu_3Al_5O_{12}$:Ce, $Gd_2SiO_5$:Ce, $Lu_2SiO_5$:Ce, $Lu_{1.8}Y_{0.2}SiO_5$:Ce or any other suitable single crystal scintillator.

In some examples the scintillator material 3 may comprise ceramic scintillators. Examples of ceramic scintillators which may be used comprise YAG:Nd, YAG:Ce, $Y_2O_3$:Nd, $Lu_2O_3$:Eu or any other suitable ceramic scintillator.

In some examples the scintillator material 3 may comprise microstructured crystal scintillators. The microstructured crystal scintillators may be arranged in columnar structures. Examples of microstructured crystal scintillators which may be used comprise CsBr:Tl, CsI:Na, CsI:Tl or any other suitable microstructured crystal scintillator.

In some examples the scintillator material 3 may comprise organic scintillators. Examples of organic scintillators which may be used comprise anthracene, stilbene, naphthalene or any other suitable organic scintillator.

In some examples the scintillator material 3 may comprise plastic scintillators. Examples of plastic scintillators which may be used comprise polystyrene (PS), polymethylmethacrylate (PMMA), polyvinyltoluene (PCT), polyvinylxylene (PVX) or any other suitable plastic scintillator.

The apparatus 1 also comprises a plurality of layers 9 of spacer material 5. The plurality of layers of spacer material 5 may be provided between the layers 9 of scintillator material 3 so that the apparatus 1 comprises a plurality of alternate layers 9 of spacer material 5 and scintillator material 3. This creates a plurality of interfaces 7 between scintillator material 3 and spacer material 5. The distance between each interface is determined by the thickness t of the layers 9.

The spacer material 5 may comprise any suitable material which may be configured to separate the layers of scintillator material 3. The spacer material 5 may comprise a material which is transparent, or at least partially transparent to the incident X-rays or other radiation. The spacer material 5 may comprise a material which is transparent, or at least partially transparent, to the photons generated by the scintillator material 3.

The spacer material 5 may have a different refractive index to the scintillator material 3. In some examples the spacer material 5 may be selected so that there is a large difference between the refractive index of the scintillator material 3 and the refractive index of the spacer material 5. This may enable reflection of the photons at the interfaces 7 between the scintillator material 3 and the spacer material 5.

In some examples the spacer material 5 may comprise silicon oxide. In other examples the spacer material 5 may comprise silica, silicate glass, transparent ceramics, metal oxides, optically transparent polymers or any other suitable material.

In some examples the spacer material 5 could comprise a second type of scintillator different to the first type of scintillator within the scintillator material 3. The second type of scintillator which is used as the spacer material 5 may have a different refractive index to the first type of scintillator within the scintillator material 3. The different types of scintillator may have as optical emission peak at the same wavelength. Having the spacer material 5 comprise a second type of scintillator may improve the efficiency of the apparatus 1 as it increases the volume of the apparatus 1 which can convert the incident radiation into photons.

The thickness t of the layers 9 within the apparatus 1 may be arranged to enable constructive interference of photons emitted by the scintillator material 3 and reflected at the interfaces 7. To enable constructive interference the thickness t of the layers 9 may be arranged so that the difference in path length between an emitted photon and a reflected photon is a multiple of half wavelengths or is close to a multiple of half wavelengths. The constructive interference may enable the photons emitted by the scintillator material 3 to interact constructively.

The thickness t of the layers 9 may be arranged so that the constructive interference occurs for photons which are emitted at an angle which is close to perpendicular to the interfaces 7. An angle close to perpendicular could be within five to ten degrees of perpendicular. This may ensure that most of the photons which are emitted by the apparatus 1 are emitted in a direction which is close to perpendicular to the interfaces 7. This may provide a narrow beam of light. In some examples the half angle of the cone of light emitted by the apparatus 1 could be less than ten degrees. In some examples the half angle of the cone of light emitted by the apparatus 1 could be such that the light is incident on a small area of a photodetector. The small area of a photodetector could be one pixel or a small number of pixels.

FIG. 2 schematically illustrates constructive interference of a photons emitted by the scintillator material 3 in the example apparatus 1. The example apparatus 1 of FIG. 2 may be the same apparatus as FIG. 1. Corresponding reference numerals are used for corresponding features.

The plurality of layers 9 within the apparatus 1 form a distributed Bragg reflector. As each of the plurality of layers 9 has a different refractive index this causes light emitted by the scintillator material 3 to be reflected by the interfaces 7 between the spacer material 5 and the scintillator material 3.

To thickness t of the layers 9 within the apparatus 1 may be arranged to enable constructive interference of light emitted by the scintillator material 3. The thickness t of the layers 9 may be arranged so that the optical path length between reflections from subsequent interfaces 7 is a half wavelength or a multiple of a half wavelength. This may enable constructive interference of the reflected components. It is to be appreciated that the optical path length need not be exactly a half wavelength or a multiple of a half wavelength but may be close enough to enable constructive interference of the reflected beams of light.

In examples of the disclosure the thickness t of layers 9 within the apparatus 1 is given by $t = x\lambda/n$, where $\lambda$ is the free-space wavelength of the photons emitted by the scintillator material 3 x is a fraction of wavelength of the photons, and n is the refractive index of the layer 9.

The layers 9 may be very thin. The layers 9 may have a thickness of the order of hundreds of nanometers.

FIG. 2 shows the reflection at each interface 7 between the layers 9 of scintillator material 3 and spacer material 5. In the example of FIG. 2 the light is emitted by the scintillator material 3 at an angle $\theta$ to the normal. The normal is perpendicular to the interfaces 7 between the layers of scintillator material 5 and the layers of spacer material 5. The angle $\theta$ may be small so that the light that is emitted by the apparatus 1 is substantially perpendicular to the apparatus 1. The light that is emitted within a few degrees of the normal. The light that is emitted may be within five degrees of the perpendicular. In some examples the light could be within ten degrees of the perpendicular. The angle $\theta$ may be such that the light which is arranged for constructive interference is focussed on a small area. The angle $\theta$ may be such that the light which is emitted by the scintillator material 3 can be focussed on a small area of a photodetector.

The Purcell effect may control the emission of the photons so that in the examples of the disclosure the directions will be close to, but not parallel with, the normal to the apparatus 1. In some examples the directions will be within several degrees of the normal to the apparatus 1.

The Purcell effect causes enhancement of the emission of photons by the scintillator material 3 in the directions which provide constructive interference. When the incident X-rays or other radiation excite atoms within the scintillator material 3 the photons will only be emitted if a transition mode is available. Where there is a band gap within the material this only allows discrete quanta of photons to be emitted. The Purcell effect increases the density of states to increase the number of photons emitted in the directions which allow for constructive interference.

In the examples of FIGS. 1 and 2 the apparatus 1 comprises seven layers 9. It is to be appreciated that any suitable number of layers could be provided in other examples of the disclosure.

The number of layers 9 within the apparatus 1 may need to be sufficient to enable the Bragg reflection of the generated photons. In some examples the apparatus 1 may comprise at least five layers 9.

The total number of layers may be increased to increase the amount of scintillator material 3 within the apparatus 1. Increasing the number of layers 9 of scintillator material 3 within the apparatus will increase the proportion of X-rays or other radiation that is detected by the apparatus 1. This will increase the sensitivity and the efficiency of the apparatus 1. However as the apparatus 1 is structured to provide a beam of light collimated within a small angle, having a large number of layers will not decrease the resolution of the images that can be obtained.

In some examples the apparatus 1 may comprise several thousand layers. For instance, if each layer is around 100 nm thick then an apparatus 1 comprising 3000 layers could be provided. Such an apparatus 1 would be around 300 μm.

In the example apparatus 1 of FIGS. 1 and 2 the layers are all of the same thickness. It is to be appreciated that as the scintillator material 3 and the spacer material 5 have different refractive indices, and the thickness t of the layers is proportional to the refractive indices, the layers 9 of each material may have different thicknesses.

In the example of FIGS. 1 and 2 each of the layers 9 of scintillator material 3 and spacer material 5 are arranged to have a thickness which enables constructive interference of reflected beams of light. In other examples the apparatus 1 may be arranged so that the combined thickness of the two adjacent layers 9 has an optical path length which creates constructive interference. For instance in some examples the spacer material 5 could absorb photons. In such examples having a large thickness of spacer material 5 could decrease the efficiency of the apparatus 1. In such cases the spacer material 5 may be provided as a thin layer on the scintillator material 3 and the combined layer of spacer material 5 and scintillator material could have a thickness which enables constructive interference.

FIG. 3 schematically illustrates an apparatus 1 in use according to examples of the disclosure. The apparatus 1 may be as described in relation to FIGS. 1 and 2 and corresponding reference numerals are used for corresponding features.

In FIG. 3 the apparatus 1 is provided within an X-ray detector 31. The X-ray detector 3 comprises a reflector 33 and a photodetector 35. The reflector 33 is provided on a first side of the apparatus 1 and the photodetector 35 is provided on a second side. The second side of the apparatus 1 is opposite to the first side.

The reflector 33 may comprise any means which may enable photons emitted from the apparatus 1 and incident on the reflector 33 to be reflected towards the photodetector 35. The reflector 33 may comprise a material which is transparent to X-rays but enables photons to be reflected. In some examples the reflector 33 may comprise aluminum or any other suitable material.

The photodetector 35 may comprise any means which may be configured to convert incident photons into an electric signal. The electric signal may be used to create an image indicative of X-rays incident on the apparatus 1. The photodetector 35 may comprise a charge-coupled device (CCD) camera, a CMOS (complementary metal oxide semiconductor) sensor or any other suitable means.

In the example of FIG. 3 an X-ray source 37 is provided. The X-ray source 37 may comprise any means which may be configured to provide X-rays 38 which can be detected by the apparatus 1. In some examples the X-ray source 37 may comprise an X-ray generator or any other suitable means.

The X-ray source 37 is provided spaced from the X-ray detector 31 so that an object 39 can be positioned between the X-ray source 37 and the X-ray detector 31. In some examples the X-ray detector 31 may be used for medical applications, in such examples the object 39 could be a human or animal or part of a human or animal. In some examples the X-ray detector 31 could be used for security purposes, in such examples the object could be inanimate objects such as bags, suitcases, vehicles or any other objects that may need to be scanned. It is to be appreciated that the X-ray detector 31 could be used in other instances other than medical or security such as industrial applications or any other suitable purpose.

In the example of FIG. 3 the X-rays that are incident on the X-ray detector 31 will be dependent upon the X-rays that are absorbed by the object.

The X-rays are incident perpendicular on the X-ray detector 31. As the apparatus 1 is arranged so that light is emitted close to perpendicular to the apparatus this enables the position of the light emitted by the apparatus 1 to correspond to the position that the incident X-rays were incident upon the apparatus 1. This enables a high resolution image to be obtained by the photodetector 35.

In some examples the X-ray detector 31 may be static relative to the X-ray source 37. In other examples the X-ray detector 31 may be configured to move relative to the source. This may enable large objects to be scanned. This may also enable multi-dimensional information to be obtained about the objects being scanned. For instance it may enable 3 dimensional X-ray images to be obtained.

FIG. 4 illustrates a method which may be used to provide apparatus 1 according to examples of the disclosure. The apparatus 1 could be an apparatus 1 as described above with reference to FIGS. 1 to 3.

The method comprises, at block 41, providing a plurality of layers 9 of scintillator material 3 configured to generate photons in response to incident X-rays. The method also comprises, at block 43, providing a plurality of layers 9 of spacer material 5 wherein the scintillator material 3 and spacer material 5 are arranged in alternate layers 9. The scintillator material 3 has a different refractive index to the spacer material 5 and the thickness of layers 9 within the plurality of layers 9 is arranged to enable constructive interference of photons emitted by the scintillator material 3.

The apparatus 1 could be fabricated using any suitable techniques. In some examples the plurality of layers 9 may be formed by spin coating, chemical vapour deposition, drip and dry solutions, extraction of polymers, physical vapour deposition such as pulsed laser deposition, reactive sputtering, sol-gel methods, layer-by-layer methods, dip coating, spray coating, electrochemical coating, coextrusion or any other suitable technique or combinations of techniques.

FIGS. 5A to 5D are plots of results obtained with a simulation example apparatus 1. The results of the plots were obtained using a simulation apparatus 1 comprising 100 layers. The scintillator material 3 comprised caesium iodide and the spacer material 5 comprised silicon dioxide.

The scintillation was modelled as an isotropically radiating dipole in a centre layer. The electromagnetic field boundary conditions are solved for each interface 7 within the apparatus 1. The Poynting vector was obtained to calculate the profile of surface emission into the air as a function of emission angle.

It is to be appreciated that, in reality all layers 9 of scintillator material 3 would radiate. For simplicity, in order to obtain the plots of FIGS. 5A to 5D, only emission from the middle layer was modelled. This provides a good approximations as there is little interaction between separate layers 9 of scintillator material 3. The exact profile of surface emission from each layer 9 of scintillator material 3 may be slightly different due to the number of surrounding layers. However similar simulations were performed using different layers 9 of scintillator material 5. Therefore it is a good approximation to use the central layer as indicative of the overall emission profile.

FIG. 5A plots, for various half-angles, the amount of power directed in a collimated emission towards a direction perpendicular to the layers 9 of the apparatus 1. In FIG. 5A plot 51 shows the amount power directed in a 10° half angle cone. Plot 53 shows the amount power directed in a 20° half angle cone. Plot 55 shows the amount power directed in a 30° half angle cone. Plot 57 shows the total emitted light. The total emitted light changes as some of the light becomes bound in internal modes within the apparatus 1.

FIG. 5B is a plot of the proportion of light in collimated emission as a fraction of the total light emitted. Plot 59 shows this for a 10° half-angled cone below and plot 61 shows the equivalent portion for isotropically emitted light. FIG. 5B shows that at certain thicknesses t there is significant enhancement of collimated emission. In the particular examples of 5B there is an enhancement of collimated emission when the layer thickness of 77.1% of the emission wavelength. At this thickness t the collimated emission reaches over seven times the case for isotropic emission.

Figure 1:
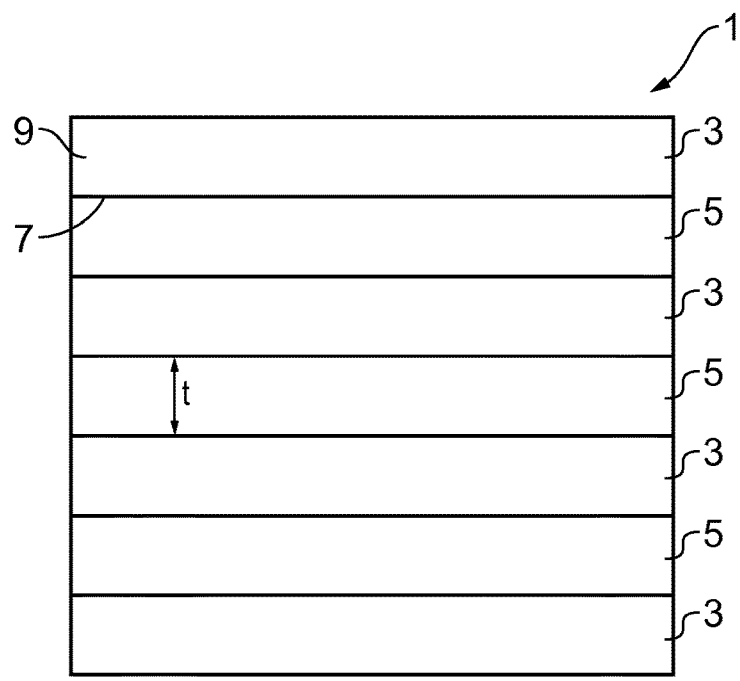
Figure 2:
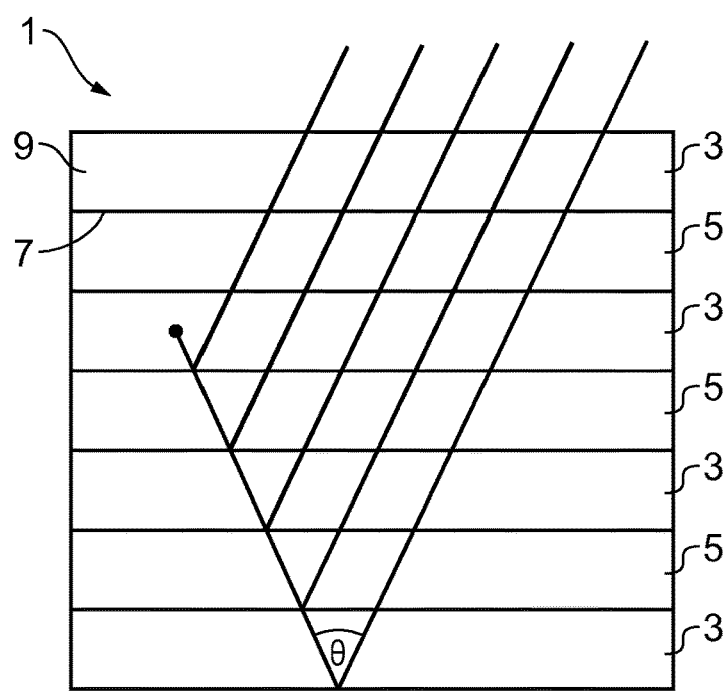
Figure 3:
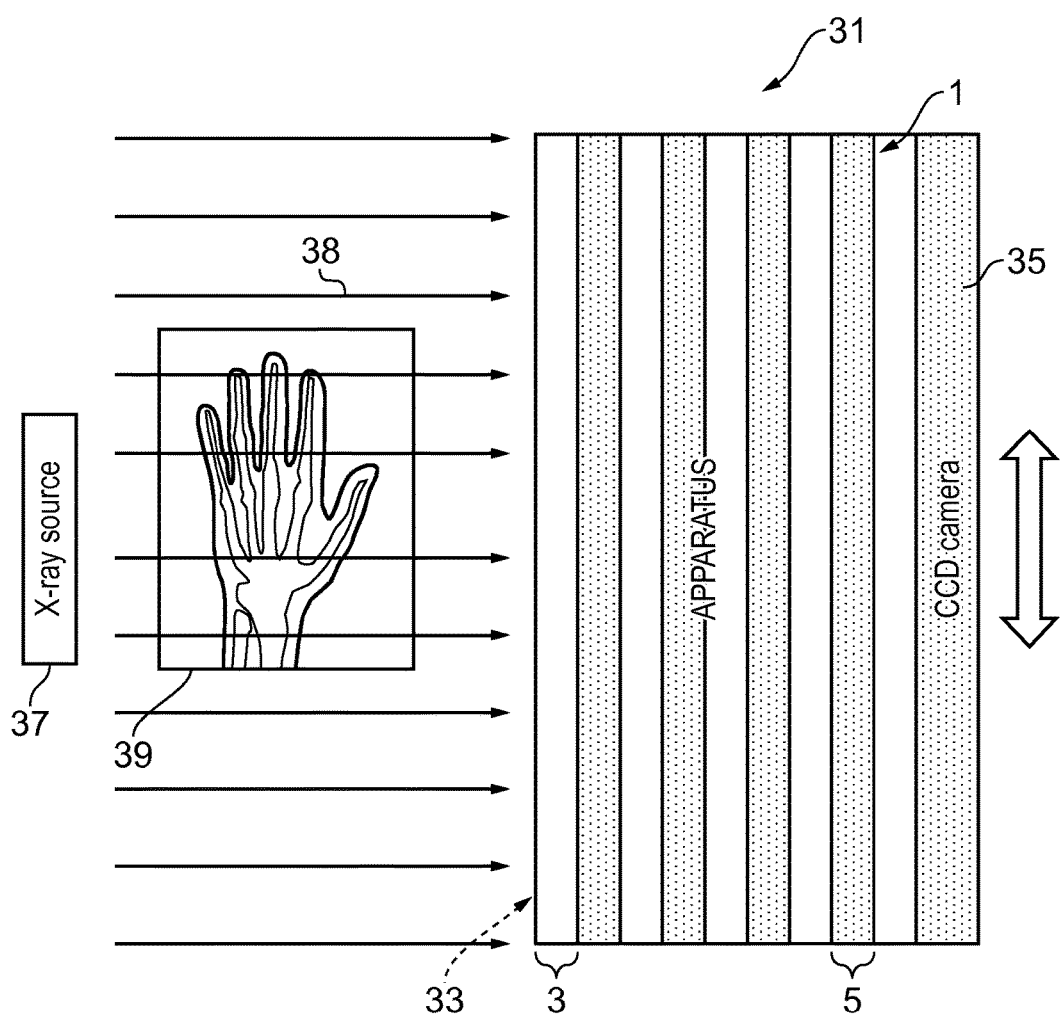
Figure 4:
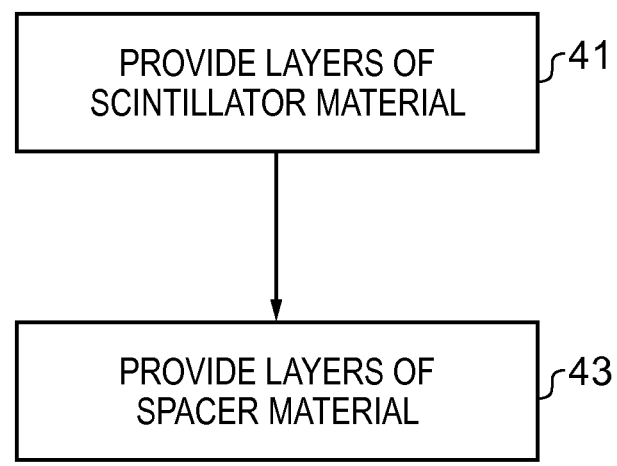
Figure 5A:
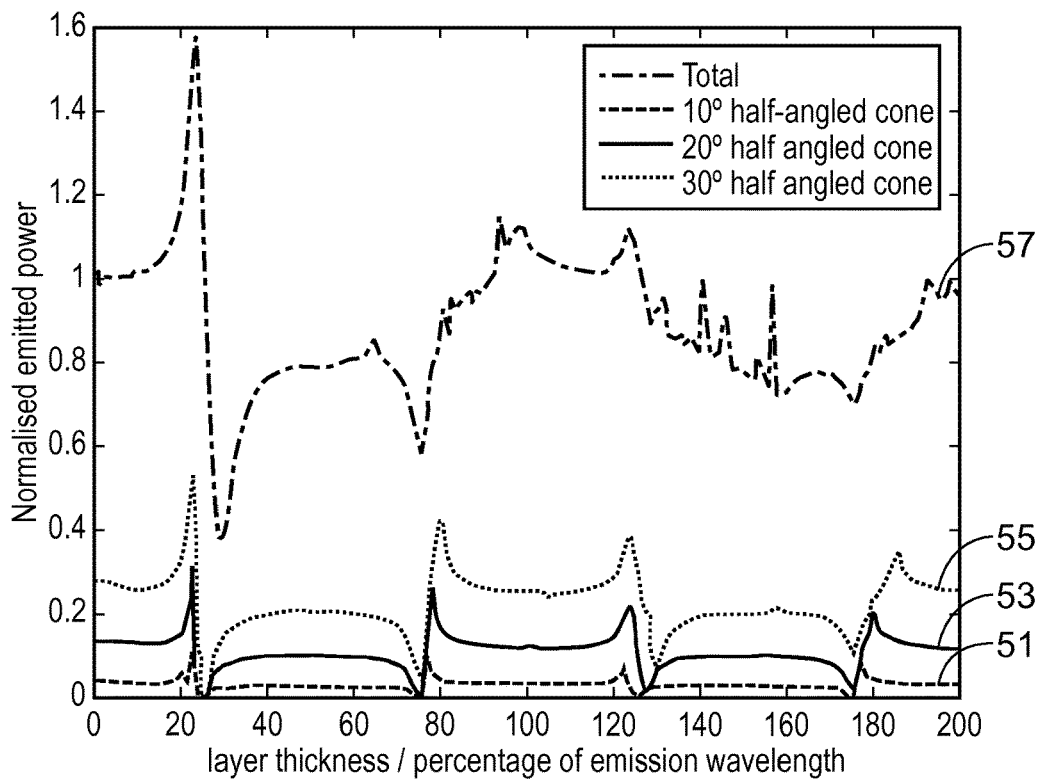
FIG. 5C shows a close up of the plot of 5B.
FIG. 5D shows the averaged angular emission profile for a layer thickness t of 77.1% of wavelength.
Figure 5B:
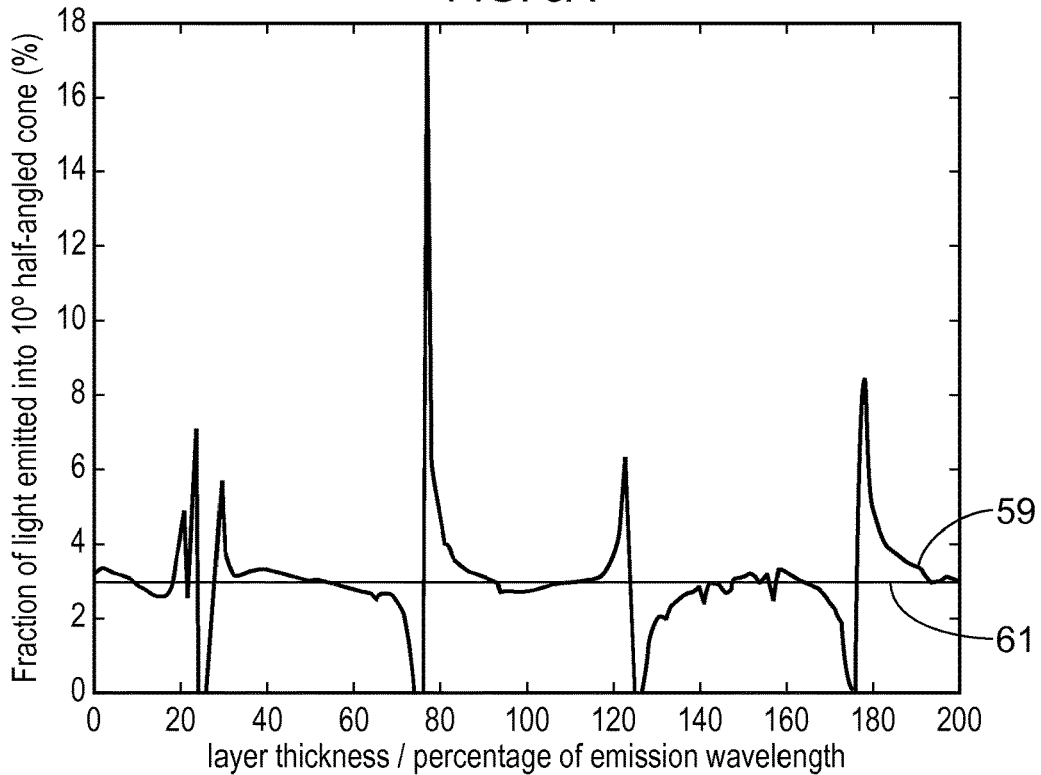
Figure 5C:
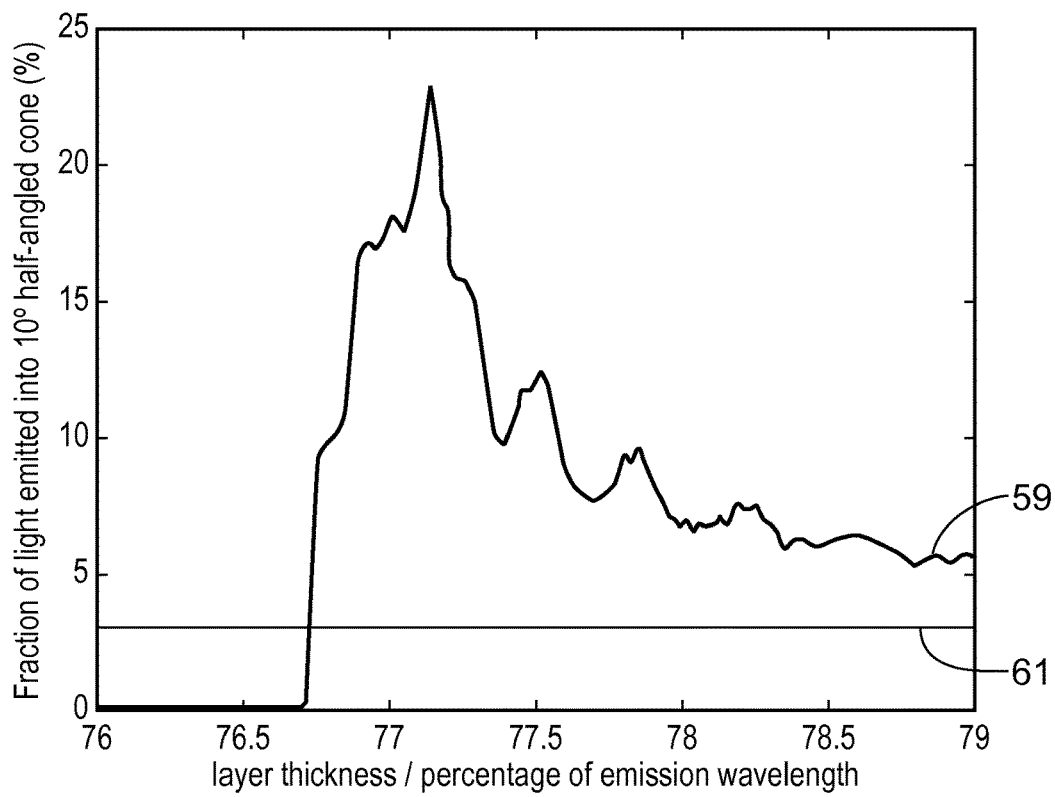
Figure 5D:
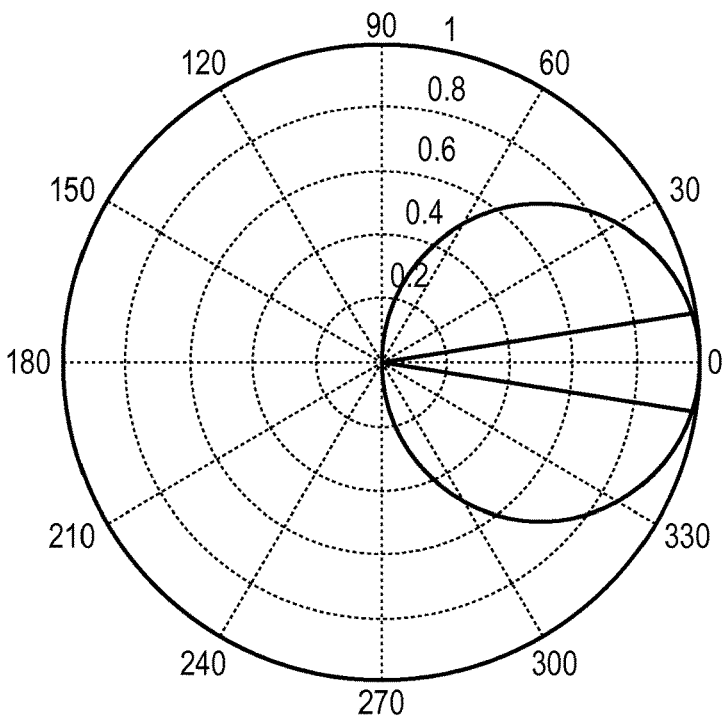

Examples of the disclosure provide the advantage that the plurality of alternating layers of scintillator material 3 and spacer material 5 allows for a large thickness of scintillator material 3 to be provided while still enabling a high resolution image to be obtained.

In some examples the apparatus 1 may enable a wider range or materials to be used as a scintillator material 3 within an X-ray detector 31.

As the apparatus 1 may enable high resolution and high sensitivity this may reduce the amount of incident X-rays needed in order to obtain images of sufficient quality. This may be useful for medical applications as it may reduce the irradiation dose required to obtain X-ray images. It may also be useful in other application as it may reduce the amount of X-rays needed.

In the above description the term "coupled" means operationally coupled. Any number of intervening components may be provided including no intervening components.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a plurality of layers of scintillator material configured to generate photons in response to incident X-ray radiation; and
   a plurality of layers of spacer material wherein the scintillator material and spacer material are arranged in alternate layers so that a plurality of interfaces are provided between layers of scintillator material and layers of spacer material;
   wherein the scintillator material has a different refractive index to the spacer material and the thickness of layers within the plurality of layers of scintillator material and the plurality of layers of spacer material is arranged to enable constructive interference of photons emitted by the scintillator material and reflected by the interfaces.

2. An apparatus as claimed in claim 1 wherein the constructive interference is configured to collimate photons emitted by the scintillator material towards a direction perpendicular to the plurality of layers of scintillator material and plurality of layers of spacer material.

3. An apparatus as claimed in claim 1 wherein the plurality of layers of scintillator material and plurality of layers of spacer material are arranged to form a distributed Bragg reflector.

4. An apparatus as claimed in claim 1 wherein the plurality of layers of scintillator material and plurality of layers of spacer material are configured so that photons emitted by the scintillator material are arranged to be focused on a pixel of a photodetector.

5. An apparatus as claimed in claim 1 wherein the scintillator material has a higher refractive index than the spacer material.

6. An apparatus as claimed in claim 1 wherein the spacer material comprises a second type of scintillator different to a first type of scintillator within the scintillator material.

7. An apparatus as claimed in claim 1 wherein the thickness t of the layers within the plurality of layers of scintillator material and plurality of layers of spacer material is given by $t=x\lambda/n$, where x is a fraction of wavelength of the photon, $\lambda$ is the free-space wavelength of the photon and n is the refractive index of the layer.

8. An apparatus as claimed in claim 1 comprising a reflective layer.

9. An apparatus as claimed in claim 1 comprising a photodetector.

10. An apparatus as claimed in claim 1 wherein the scintillator material comprises microstructured crystal scintillators.

11. An apparatus as claimed in claim 1 wherein the scintillator material is arranged in columnar structures.

12. A radiation detector comprising:
    a plurality of layers of scintillator material configured to generate photons in response to incident X-ray radiation; and
    a plurality of layers of spacer material wherein the scintillator material and spacer material are arranged in alternate layers so that a plurality of interfaces are provided between layers of scintillator material and layers of spacer material;
    wherein the scintillator material has a different refractive index to the spacer material and the thickness of layers within the plurality of layers is arranged to enable constructive interference of photons emitted by the scintillator material and reflected by the interfaces.

13. A method comprising:
    providing a plurality of layers of scintillator material configured to generate photons in response to incident X-ray radiation; and
    providing a plurality of layers of spacer material wherein the scintillator material and spacer material are arranged in alternate layers so that a plurality of interfaces are provided between layers of scintillator material and layers of spacer material;
    wherein the scintillator material has a different refractive index to the spacer material and the thickness of layers within the plurality of layers is arranged to enable constructive interference of photons emitted by the scintillator material and reflected by the interfaces.

14. A method as claimed in claim 13 wherein the constructive interference is configured to collimate photons emitted by the scintillator material towards a direction perpendicular to the plurality of layers of scintillator material and plurality of layers of spacer material.

15. A method as claimed in claim 13 wherein the plurality of layers of scintillator material and plurality of layers of spacer material are arranged to form a distributed Bragg reflector.

16. A method as claimed in claim 13 wherein the plurality of layers of scintillator material and plurality of layers of spacer material are configured so that photons emitted by the scintillator material are arranged to be focused on a pixel of a photodetector.

17. A method as claimed in claim 13 wherein the scintillator material has a higher refractive index than the spacer material.

18. A method as claimed in claim 13 wherein the spacer material comprises a second type of scintillator different to a first type of scintillator within the scintillator material.

19. A method as claimed in claim 13 wherein the thickness t of the individual layers within the plurality of layers of scintillator material and plurality of layers of spacer material is given by $t = x\lambda/n$, where x is a fraction of wavelength of the photon, $\lambda$ is the free-space wavelength of the photon and n is the refractive index of the layer.

20. A method as claimed in claim 13 wherein the plurality of layers of scintillator material and the plurality of layers of spacer material are arranged to form a lamina structure, and providing a reflective layer on a first side of the lamina structure.

21. The method of claim 1, wherein the alternate layers of the scintillator material and the spacer material are arranged in a direction perpendicular to a direction associated with the incident X-ray radiation.

22. The radiation detector of claim 12, wherein the alternate layers of the scintillator material and the spacer material are arranged in a direction perpendicular to a direction associated with the incident X-ray radiation.

23. The method of claim 13, wherein the alternate layers of the scintillator material and the spacer material are arranged in a direction perpendicular to a direction associated with the incident X-ray radiation.

* * * * *